(12) United States Patent
Velasquez

(10) Patent No.: US 9,526,369 B2
(45) Date of Patent: Dec. 27, 2016

(54) INFUSION EXTRACTING APPARATUS AND METHOD

(71) Applicant: Jennifer Rose Rivera Velasquez, Hermosa Beach, CA (US)

(72) Inventor: Jennifer Rose Rivera Velasquez, Hermosa Beach, CA (US)

(73) Assignee: Made Simpli, LLC, Hermosa Beach, CA (US)

( * ) Notice: Subject to any disclaimer, the term of this patent is extended or adjusted under 35 U.S.C. 154(b) by 0 days.

(21) Appl. No.: 14/593,643

(22) Filed: Jan. 9, 2015

(65) Prior Publication Data
US 2015/0196158 A1    Jul. 16, 2015

Related U.S. Application Data

(60) Provisional application No. 61/964,621, filed on Jan. 10, 2014.

(51) Int. Cl.
*A47J 31/20* (2006.01)

(52) U.S. Cl.
CPC ...................... *A47J 31/20* (2013.01)

(58) Field of Classification Search
CPC ............. A47J 31/18; A47J 31/20; A47J 31/38
USPC ........................................... 99/279, 316–319
See application file for complete search history.

(56) References Cited

U.S. PATENT DOCUMENTS

| | | | | |
|---|---|---|---|---|
| 482,299 A | * | 9/1892 | Comstock | A47J 31/20 222/482 |
| 512,675 A | * | 1/1894 | Appleberg | A47J 31/02 99/299 |
| 882,183 A | * | 3/1908 | Wells | A47J 31/20 99/319 |
| 2,109,363 A | * | 2/1938 | Williams | A47J 31/20 99/284 |
| 2,562,433 A | * | 7/1951 | Moore | A47J 31/20 99/300 |
| 3,020,823 A | * | 2/1962 | Musso | A47J 31/20 426/433 |

(Continued)

FOREIGN PATENT DOCUMENTS

| | | | | |
|---|---|---|---|---|
| CH | 243568 A | * | 7/1946 | ............. A47J 31/20 |
| DE | 19548130 A1 | * | 2/1997 | ............. A47J 31/20 |

(Continued)

*Primary Examiner* — David Angwin
*Assistant Examiner* — John J Norton
(74) *Attorney, Agent, or Firm* — Larry J. Guffey, Esq.; Pamela K. Riewerts, Esq.; Oliver & Grimsley, LLC

(57) ABSTRACT

A piston-type extraction apparatus and methods for making and using the same are disclosed. The apparatus includes a cylindrical container with lid and pour spout, a container insert, and plunger element including piston, rod, handle, and filtration chamber. The container insert is designed to catch coffee grounds or other infusible material which may be easily removed from the container when the container is empty or when the extract fluid remains in the container. The filtration chamber is adapted for use with a paper filter. The plunger element may temporarily couple with the insert to allow the insert to be pulled up through the container with the grounds of other infusible material captured between the insert and the plunger element allowing for quick and easy cleanup. The extraction apparatus is adapted for a use in a variety of sizes and may be adapted for manufactured at low cost.

9 Claims, 10 Drawing Sheets

(56) References Cited

U.S. PATENT DOCUMENTS

| | | | | |
|---|---|---|---|---|
| 5,618,570 A * | 4/1997 | Banks | A47J 31/20 | |
| | | | 426/435 | |
| 5,887,510 A * | 3/1999 | Porter | A47J 31/20 | |
| | | | 99/287 | |
| 5,979,299 A * | 11/1999 | Hornsby | A47J 31/20 | |
| | | | 426/433 | |
| 6,324,966 B1 * | 12/2001 | Joergensen | A47J 31/20 | |
| | | | 99/287 | |
| 2006/0124628 A1 * | 6/2006 | Long | A47J 31/20 | |
| | | | 219/438 | |
| 2011/0056385 A1 * | 3/2011 | McLean | A47J 31/20 | |
| | | | 99/297 | |
| 2012/0328750 A1 * | 12/2012 | Giordano | A47J 31/20 | |
| | | | 426/433 | |
| 2013/0233177 A1 * | 9/2013 | Lambert | A47J 31/38 | |
| | | | 99/295 | |

FOREIGN PATENT DOCUMENTS

| | | | | |
|---|---|---|---|---|
| DK | WO 02067739 A1 * | 9/2002 | | A47J 31/20 |
| DK | WO 2012025125 A2 * | 3/2012 | | A47J 31/20 |
| DK | EP 2798985 A1 * | 11/2014 | | A47J 31/18 |

* cited by examiner

INFUSION EXTRACTING APPARATUS AND METHOD

CROSS-REFERENCE TO RELATED APPLICATION

The present non-provisional application claims the benefit of commonly assigned provisional application having Ser. No. 61/964,621 filed Jan. 10, 2014, and entitled COFFEE AND TEA DOUBLE PRESS which application is incorporated herein by reference in its entirety.

FIELD OF INVENTION

The present invention is related to a piston-type apparatus capable of use for extracting an infusible material from an extract (such as coffee or tea) and method for using the same.

BACKGROUND

Extraction devices, such as the French Press type coffee maker, have been in use for many years. Generally, they involve placing an infusible material (such as ground coffee beans or tea leaves) in a container filled with hot water and, after allowing the mixture to steep for a sufficient time period, the infusible material is pushed downward into the container using a plunger with strainer to separate the infusible material from the extract. The infusible material is trapped between the strainer and the bottom of the container, and the extract is poured out. Such devices and methods are not limited to use with coffee or tea. Some medical devices, for example, operate with a similar manner and technique.

The basic problems associated with prior art devices and methods is that they do not allow for easy cleanup of the infusible material once the extraction has taken place and/or they require that the extract be poured out of the container before the infusible material can be easily removed. For example, with a typical prior art French Press type coffee maker, the user must remove the plunger and strainer and then wash the spent grounds out of the container. This can be a messy process, particularly if there is not a handy water source. And, it can difficult to remove coffee grounds using water without have a significant portion wash down a drain or otherwise get all over the sink. If a user decides to leave the coffee grounds in the container, then she must remove the extract immediately or otherwise the extract will become bitter as some portion of the extract remains in contact with the coffee grounds until either the grounds or the extract is completely removed.

What is needed is a French Press type apparatus that allows for separation of the infusible material from the extract, easy cleanup and the ability to remove the infusible material without having to remove the extract.

SUMMARY OF INVENTION

The present invention provides an improved extract separation apparatus adapted to address some of the shortcomings of French Press type extraction apparati known in the prior art.

In an example embodiment of the present invention, an extract separation apparatus for separating an infused extract from a mixture of an infusible material and the extract is described. The apparatus in such example embodiment comprises:

1) An infusing container adapted for holding a mixture of extract and infusible material and having a bottom and one or more substantially vertical walls oriented substantially parallel to a vertical axis of the container. The container may have a removable lid, pouring spout, and handle;
2) a container insert adapted to be inserted into the container and moved down the vertical axis of the container and be seated at or near the bottom of the container. The insert has a beveled (or sloping) rim adapted to allow infusing materials to slide down into the bottom of the insert and as well as allow infusing material to flow into the space defined between the insert and the container wall. The insert rim also has a peripheral sealing means adapted to prevent infusible material (i.e grounds) from getting to into the space between the insert and the container wall while allowing easy insertion and extraction of the insert from the container. The insert and plunger element have corresponding coupling means for temporarily coupling the insert to the plunger element when the plunger element is pushed down into the insert; and
3) a plunger element comprising a rod connected with a handle at one end and with a filtration chamber at the other end, the filtration chamber comprising a) an upper perforated surface with peripheral seal adapted to separate the extract from the infusible material when the chamber is pushed down into a the container containing the mixture of extract and infusible material along the container vertical axis, b) a lower perforated surface similar to the upper perforated surface, and c) walls connecting the upper and lower perforated surfaces, the walls having a coupling means adapted to temporarily engage with the corresponding insert coupling means allowing the plunger to be coupled with the insert when the plunger element has been pushed sufficiently down into the insert trapping the infusible material between the insert and the plunger element and pulled up together leaving the extract in the container. In some embodiments, the interior of the filtration chamber is accessible to allow placement of one or more additional filter means (such as a paper filter) within it.

DRAWINGS

Reference Numerals

Figure 1:
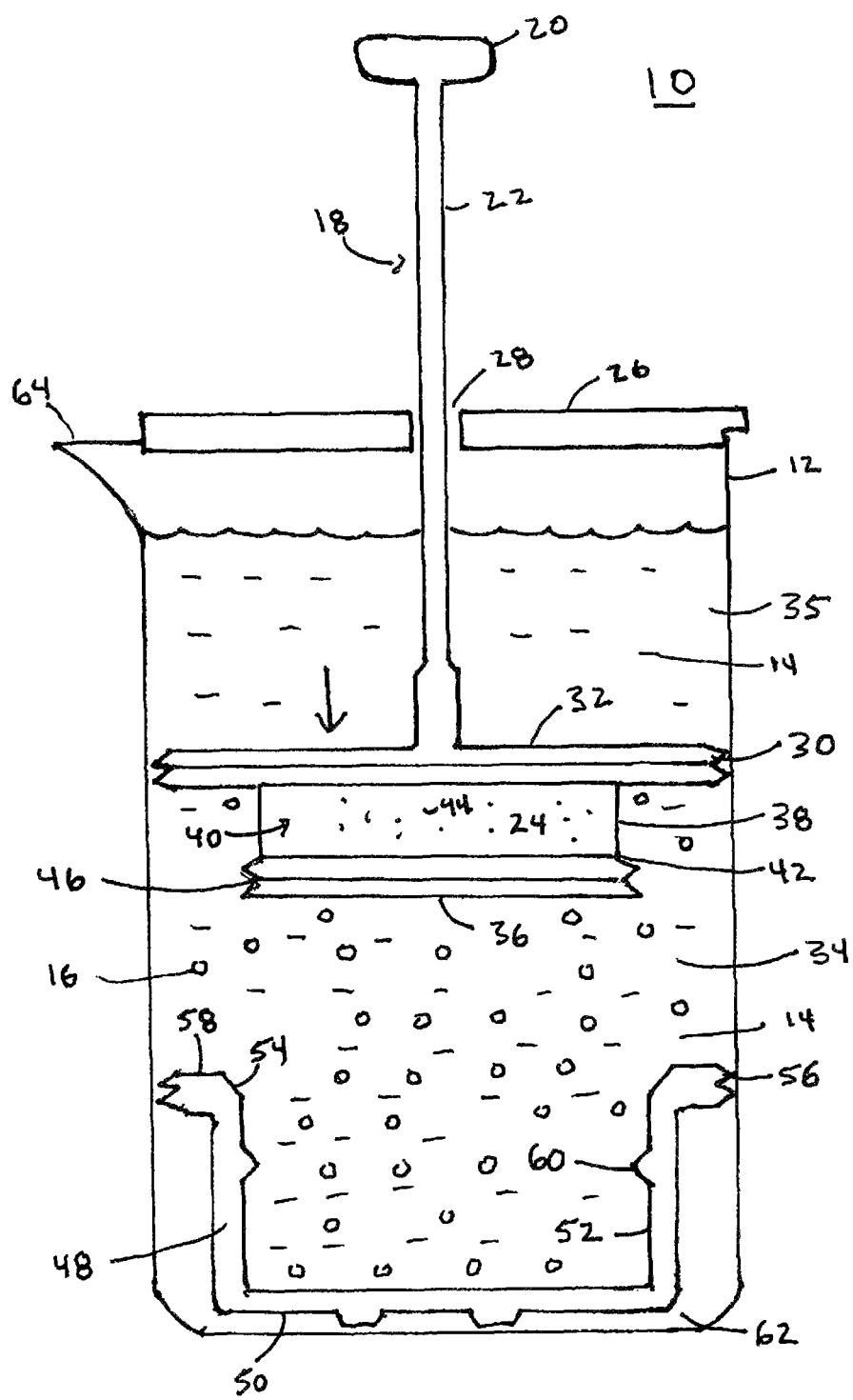
FIG. 1 depicts a vertical section of an example embodiment consistent with the principles of the present invention showing a plunging element in a starting position inside an infusing container having an insert and containing a mixture of infusible material and extract.

10 filtration apparatus
12 filtration container
14 extract
16 infusible material
18 plunger element
20 handle
22 rod
24 filtration basket
26 container lid
28 container lid hole
30 filtration basket sealing means
32 first surface of filtration basket
34 mixture chamber
35 first filtered extract chamber
36 second surface of filtration basket
38 third surface of filtration basket (i.e. filtration basket side walls)
40 filtration basket chamber
42 filtration basket chamber access means
44 filtration basket filter openings
46 filtration basket coupling means
48 container insert
50 insert bottom
52 insert side walls
54 insert rim
56 insert sealing means
58 insert filtration openings
60 insert coupling means
62 defined space between bottom of insert and container
64 pouring spout The Figures are for purposes of illustrating several embodiments of the assembly and method consistent with the principles of the present invention and are not for purposes of limiting the same.

DETAILED DESCRIPTION OF THE PREFERRED EMBODIMENTS

FIG. 1 is a vertical section view of an embodiment of the extraction apparatus which is configured similarly to a French Press type coffee or tea making apparatus. FIG. 1 shows the extraction apparatus 10 in a first or starting position for separating the extract 14 from the mixture of extract 14 and infusible material 16 in the infusing container 12.

The extraction apparatus 10 comprises an exemplary walled cylinder infusing container 12 containing a mixture of extract 14 and infusible material 16. The infusing container may be made of glass, metal, or other materials typically used with coffee/tea making apparati. The plunger element 18 is adapted to fit within the infusing container 12 and be moved within the infusing container 12 along a central vertical axis thereof. The plunger element may comprise a handle 20 attached with a rod 22 attached with a filtration chamber 24. The extraction apparatus 10 may additionally comprise a lid 26 with a central hole 28 through which the rod 22 may pass to assist in centering the filtration basket 24 and prevent it from tilting. The filtration basket 24 additionally comprises sealing means 30 situated at the edge of the first perforated surface or wall 32 of the filtration chamber 24, which is oriented substantially transverse to the vertical axis of the infusing container 12. The purpose of the sealing means is to prevent infusible material 16 from being allowed above the filtration basket 24 as filtration basket 24 is moved down into the container with mixture of extract 14 and infusible material 16. The first perforated surface 32 is the top surface of the filtration basket and allows the extract 14 to flow it while the filtration basket 24 is pushed down into the container. In essence, the infusing container 12, the first perforated surface 32 and sealing means 30 of the filtration basket 24 define a first chamber 34 containing the mixture of extract 14 and infusible material 16.

The filtration basket 24 of the plunger element 18 also defines a second surface or wall 36 oriented substantially parallel to the first surface 32. The second surface 36 is connected with the first surface 32 by means of side walls 38 (also called the third surface) that are substantially perpendicular to the first surface 32 and second surface 36 as shown, but which in alternative embodiments may slant inward to join a wider first surface with a relatively narrower second surface.

As shown in FIG. 1, the combination of first surface 32, second surface 36 and connecting side walls 38 (the third surface) form a basket which may be a cylindrical shape or alternatively in the shape of a conical frustum defining a hollow interior space or first filtration chamber 40 which may be accessible by way of access means 42 located in one or more of the first, second or side surfaces. Such access means 42, for example, may include a screw off opening with threaded joints located, for example, between the bottom surface 36 and the side wall 38 allowing the second surface 36 to be removed by screwing the second surface on or off to access the filtration chamber 40. In alternative embodiments, such threaded joints could be located between the first surface 32 and the side walls 38 or at a location along the side walls 38. In alternative embodiments, the access means could be an opening in any of the first 32, second 36 or side wall surfaces 38. In alternative embodiments, the opening may be accessible using clipping or other temporary fastening means as known in the industry.

Figure 4:
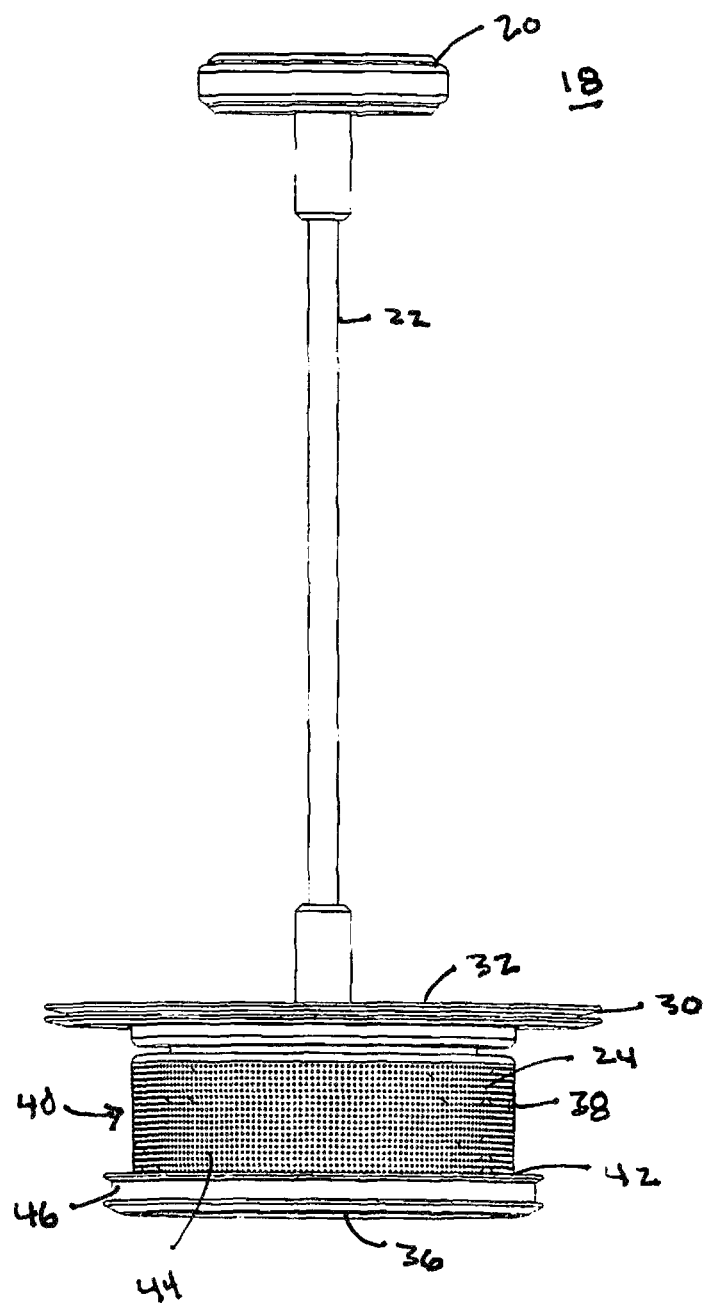
FIG. 4 depicts a side perspective view of an example embodiment of a plunger element consistent with the principles of the present invention.
Figure 5:
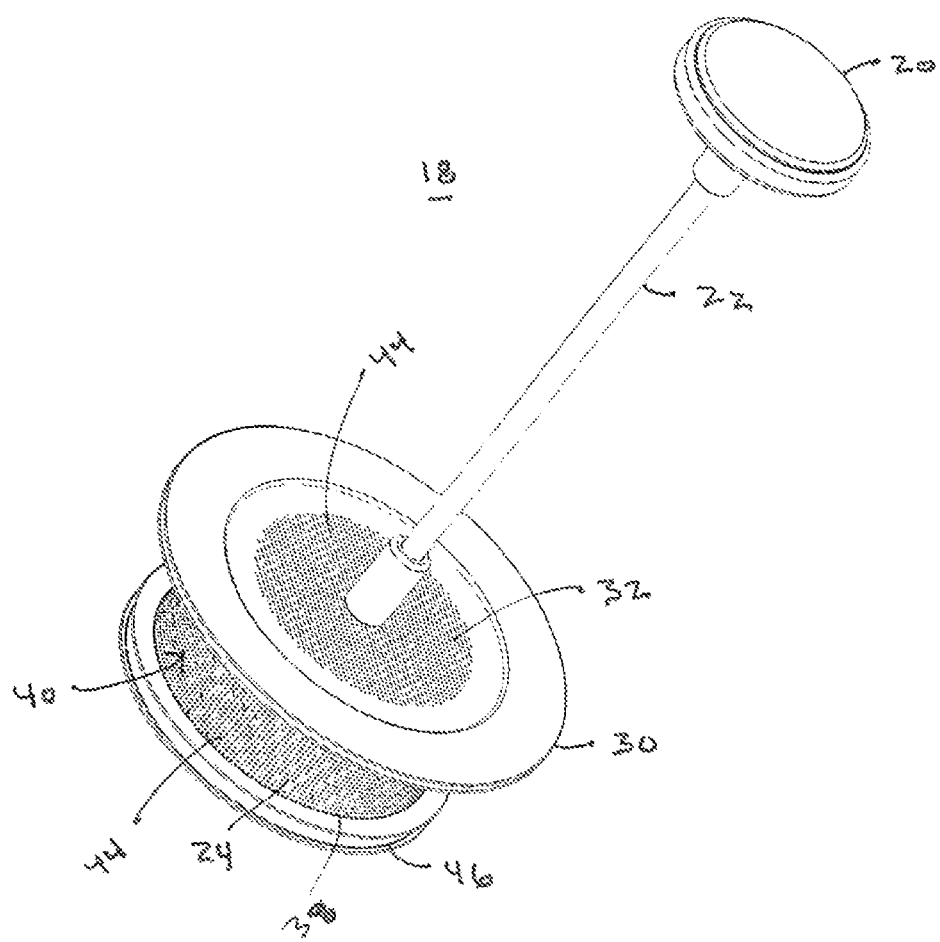
FIG. 5 top side perspective view of the exemplary embodiment of the plunger element shown in FIG. 4.
Figure 6:
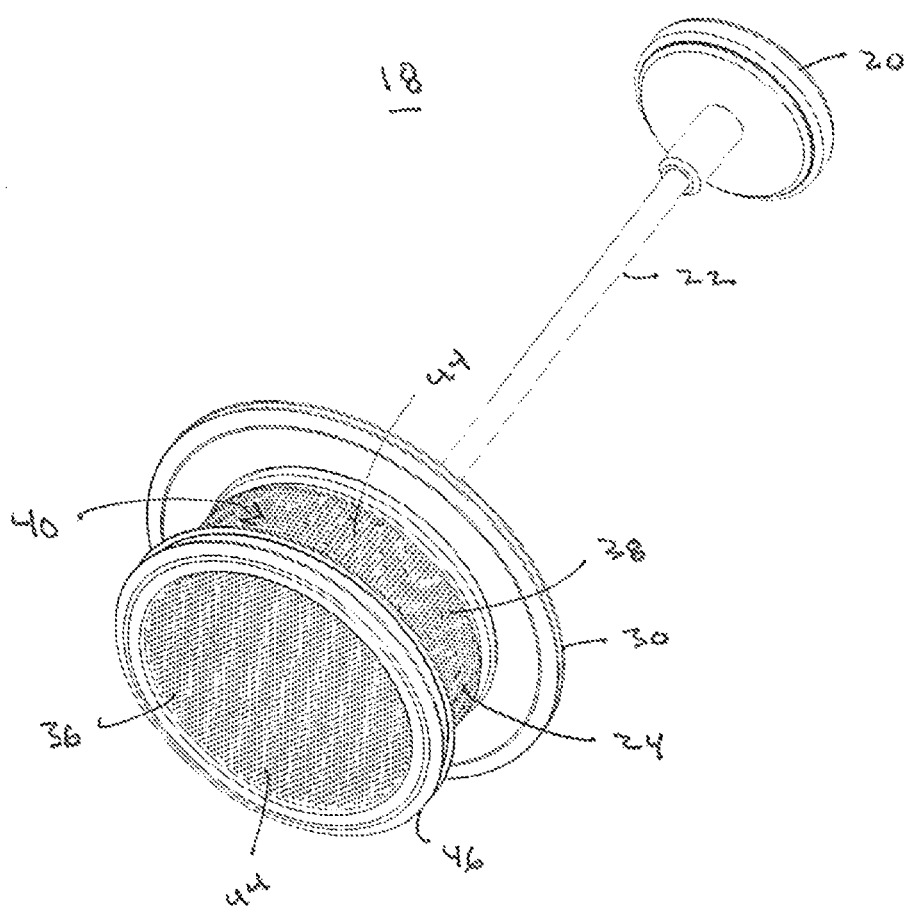
FIG. 6 is a bottom side perspective view of an exemplary embodiment of the plunger element shown in FIGS. 4 and 5.

As shown in the exemplary embodiment depicted in FIGS. 4-6, the first surface 32, second surface 36, and side walls 38 of the filtration basket 24 are adapted to permit the flow of extract from a first chamber 34 (containing a mixture of extract 14 and infusible material 16) to a second chamber 35 (containing only the extract 14). In the embodiment shown, the first surface 32, second surface 36 and side walls 38 comprise one or more filter openings (or perforation holes) 44 adapted such that extract 14 flowing through the filter openings 44 may pass through the filter openings 44 to allow substantial separation of the extract 14 from the infusible material 16. In some embodiments, the apertures of the filter openings 44 may be small enough to substantially exclude the infusible material 16 from passing through the filter openings 44. The filter openings 44 can be the perforations in a substantially perforated surface or may the openings in a mesh material used to form the surfaces of the filtration basket 24. Alternatively, the filter openings 44 may be formed by any suitable method, such as one or more of:

stamping, chemical etching, laser etching, molding, weaving, welding, machining, sintering, felting, foaming, paper making, piercing, or any other method adapted to create small and preferably uniform apertures. A common embodiment of the surfaces having filter openings 44 would be a screen or mesh having many apertures comprised of a suitable material as described above. Additionally, the filter openings 44 themselves may be multi-staged, comprising a plurality of individual filter elements (for example, stacked mesh and paper).

In addition to the filter openings 44, one or more of the first surface 32, second surface 36 of side walls 38 of the filter basket contains a filtration basket coupling means 46 for coupling the plunger element 18 with the container insert 48. In the embodiment shown in FIGS. 1-3, the coupling means consists of corresponding double ridge seal 46 made of strong, durable but elastic materials such as silicone or rubber located at or near bottom edge of the third surface (sidewall) 38 of the filtration basket 24 which may couple with a ridged node or ring 60 located at the interior surface of the insert. In alternative embodiments, the coupling means consist simply of the double ridged seal 46 which fits snugly down into the insert such that the seal 46 will slide down the interior walls of the insert when the plunger is pushed down, but which will hold enough tension against the interior walls of the insert to temporarily couple with the insert (i.e. provide enough friction) to allow the insert and plunger to be easily pulled up together while holding the infusible material between the third surface of the plunger 36 and the bottom interior surface of the insert. Other alternative coupling means are contemplated by the invention including the use of clips, corresponding overlapping rubber or silicone seals or rings, and other equivalent temporary coupling means known in the industry. Such coupling means should be easily detachable when the plunger element 18, insert 48 and infusible material have been pulled out of the container 12 allowing the infusible material 12 to be easily accessed and discarded.

The container insert 48, as shown in FIG. 1, is adapted to be inserted into the filtration container 12 and pushed down along the filtration container 12 vertical access and seated between the bottom of the filtration container 12 such that a portion of the bottom surface of the container insert 48 is seated against the bottom of the filtration container 12. The container insert 48 is a substantially open container design having bottom 50, side walls 52, and rim 54 having interior and exterior surface and the rim 54 also having peripheral sealing means 56 and filtration openings 58. In the example embodiment shown, the rim 54 is beveled (or sloped) inward to allow the infusible material 16 to more easily move down into the insert when the plunging element 18 is pushed into the container. The interior surface of the container insert 48 may also have coupling means 60 adapted to be coupled with the filtration basket coupling means 46 as described more thoroughly below.

In some embodiments, the side walls 52 and rim 54 with peripheral sealing means 56 of the container insert 48 are adapted to define a second filtration chamber 62 between the exterior surfaces of the container insert and the interior surface of the infusion container. In such embodiments, filtration openings 58 are located at the rim 54 to allow extract 14 to flow into the space 62 while substantially preventing the infusible material 16 from flowing therein. In such embodiments, the filtration openings 58 consist of perforated mesh or other opening large enough to allow extract 14 into the space 62 but prevent infusible material 16 from doing so. The peripheral sealing means 56 prevents infusible material from flowing around the rim of the container insert 48 into the chamber 62 while also allowing the insert to be more easily pushed into or pulled out of the infusing container 12 when extract 14 remains in the container 12. In alternative embodiments designed to allow the plunger element 18 and insert 48 to be pulled out of the container only after the extract has been removed, there is no need for the filtration openings 58 at the insert rim 54.

In the exemplary embodiment shown in FIG. 1, the infusing container 12 comprises a substantially vertical walled cylinder container, with a substantially circular cross-section, the first surface 32 of the filtration basket 24 is substantially circular in cross-section adapted to fit inside the cylindrical infusing container 32, and the second surface 36 is substantially cylindrical with a substantially circular cross-section. The side walls 38 of the filtration basket 24 are substantially vertical. Sealing means 30 consisting of a double pointed gasket is situated around the outside edge of the first surface 32 of the filtration basket 24 to provide a seal against the cylindrical wall of the infusing container 12 when the plunger element 18 is moved inside the container, to substantially prevent extract 14 material from leaking around the sealing means 30. In alternative embodiments of the invention, the infusing container 12 and mating plunger element 18 with filtration basket 24 with first surface 32 thereof may optionally have another cross-sectional shape, such as a square or rectangular of other shape for example, wherein the sealing means 30 may be situated around the edge or edges of the first surface 32 of the filtration basket 24. Further, in alternative embodiments, the second surface 36 of the filtration basket 24 may optionally have another shape, such as a rectangular prism or conical frustum, for example. In an alternative embodiment, the plunger element 18 having filtration basket 24 may be provided independently, adapted to fit inside an existing infusing container design, for use as an extraction apparatus Likewise, and as shown in FIG. 1, the container insert 48 is substantially circular in cross-section and adapted to fit inside the cylindrical infusing container 12. The container insert may be made of any strong, light and moldable material used in the manufacture of press type extract apparatus such as plastic, metal, and other such materials. The sealing means 56 is situated around the substantially circular outside edge of the insert rim 54 to provide a seal against the cylindrical wall of the infusing container 12 when the insert 12 is moved inside the infusing container 12 and is seated at the bottom of the infusing container 12 to substantially prevent infusible material 16 from leaking around the sealing means 56 when the extract 14 and infusible material 16 are pushed downward along the vertical axis of the infusion container 12 during use. In alternative embodiments of the invention, the infusing container 12 and mating container insert 48 may optionally have another cross-sectional shape, such as a square or rectangular or other shape for example, wherein the sealing means 56 may be situated around the edge or edges of the insert rim 52. Further, in alternative embodiments, the container insert 48 may be provided independently, adapted to fit inside an existing infusing container design. In such an embodiment, the plunger element 18 with filtration basket 24 as well as the mating container insert 48 may be adapted for retrofittable use with one or more existing infusing containers, such as one or more standard or commonly available infusing containers from existing French press extraction apparati, as are known in the art.

In embodiments of the invention including an infusing container 12, the infusing container 12 may be made from any suitable material such as one or more of: glass, plastic, ceramic, metal or other suitable material, for example. Additionally, the infusing container 12 may optionally include a double-layered wall, such as a double metal wall, with a vacuum or other suitable and preferably insulative substance between the two walls of the infusing container 12 during the extraction process. Further, the plunger element 18, container insert 48, and components thereof may be made from any suitable material such as one or more of polymer, composite, metal, ceramic or other suitable materials, for example.

The first surface sealing means 30 as well as filtration basket coupling means 46 and the peripheral container insert sealing means 56 may comprise any suitable known seal material and/or design. Such sealing means designs may include single or multiple lip seals, single or multiple wiper seals, single or double ridged seals, and single or multiple U-cup seal designs, for example. Suitable such single or multiple U-cup seal designs may desirably be self-energizing, such that an outer edge of the U-cup seal actively engages and seals with the inner wall of the infusing container 12 or insert 48 while allowing the plunger element to be pushed down into the container 12. Exemplary suitable seal materials may comprise one or more of: silicone, polymers (such as polyurethane for example) and silicone or polymer materials impregnated with carbon or other additives. Additionally, sealing means (30, 46 and 56) may comprise one or more such suitable seal materials by themselves, or alternatively, such seal materials may surround or be overmolded over a support material, such as a metal or composite support material, for example. The above described exemplary sealing means materials and designs may also apply to sealing means incorporated in other embodiments of the invention, such as those described herein.

As shown in the example embodiment of FIG. 1 and described above, the filtration basket 24 has coupling means 46 configured to mate with corresponding coupling means 60 located on the inside walls of the container insert 48. The purpose of the coupling means is to provide a temporary engagement between the plunging element 18 and the container insert 48 when the plunging element 18 is pushed down into the infusion container 12 containing the container insert 48 such that the walls of the filtration basket 24 of the plunging element 18 are within the concave walls of the container insert 48 and the infusible material 16 has been trapped at the bottom between the second surface 36 of the plunger element 18. The coupling of the filtration basket and the insert allows the plunging element 18 and container insert 48 to be pulled up together holding the infusible material, substantially removing the infusible material from the filtration container 12. Thus, the coupling must be strong enough to hold while the plunger element 18 and insert 48 are being pulled up together. In the example shown a single corresponding coupling means is utilized. In alternative embodiments, more than one coupling means may be utilized. In embodiments having filtration openings 58 located at the rim of the container insert 48, such openings would allow the extract to flow from the first chamber through to a third chamber (defined between the outer surface of the insert and the container bottom 62) as the plunging element 18 and container insert 48 are being pulled up and out of the filtration container 12 while extract remains in the container 12. In this way, the infusible material 16 may be pulled out of the container leaving the extract 14 behind in the infusion container 12. Such filtration openings 58 are also helpful, however, in preventing a vacuum to build up in the space 62 between the container and the insert which would otherwise inhibit the insert 48 from being pulled up even if the extract has already been poured away from the container 12. In such embodiments, it may be preferable for the insert to have perforations in the sides and/or bottom to increase the ease in which the insert may be pulled in or out of the container with liquid contained therein.

As noted above, one example of corresponding coupling means is shown in FIG. 1 which includes a circular banded protrusion located at the side wall 38 of the filtration basket 24 and corresponding circular banded protrusion 60 located at the interior surface of the container insert 48 at a location below the insert rim 52. The corresponding banded coupling means of the filtration basket and container insert are elastic enough to allow the filtration basket to be pushed into the container insert far enough that the coupling means of the filtration basket will move beyond the coupling means of the insert when the plunging element 18 is pushed down into the container insert 48 such that the infusible material is lodge (caught or otherwise pressed) between the second surface of the filtration basket and the bottom inside surface of the container insert. Once the coupling means is engaged as described, the coupling means must be strong enough to remain engaged while the plunger element 18 with container insert 48 is pulled from the container. But the coupling means must also allow for easy detachment of the plunger element from the insert when the two have been removed from the container to allow the spent infusible material 16 to be removed.

Examples of alternative coupling means may include other fasteners such as hook and loop (Velcro), clips, suction cups or even threaded (i.e. screw in) type means which would allow the filtration basket to engage with the insert and be pulled up through the container and subsequently disengaged without difficulty. In some embodiments, the coupling means may consist of a silicone seal 46 that presses against the interior surface of the insert 48 as it moves downward and fits snugly enough to allow the plunder element 18 and insert 48 to be pulled up together without decoupling. In such embodiments, it may not be necessary to have a corresponding protruding nub or ring 60 at the interior surface of the insert. And, such arrangement may be actually beneficial in insuring a greater compression of the infusible material at the bottom of the insert as the plunger will not be inhibited by the location of such corresponding coupling means.

In some common exemplary embodiments of the invention, the extraction apparatus 10 may be configured for extracting a hot beverage extract 14 from infusible plant material 16, such as in embodiments where infusible material 16 may comprise coffee grounds, tea leaves or herbal infusibles, for example, and extract 14 may comprise coffee, tea or herbal tisane, respectively. In the common example of coffee extraction, the extraction ground coffee infusible material 16 may result in a coffee extract 14.

Figure 2:
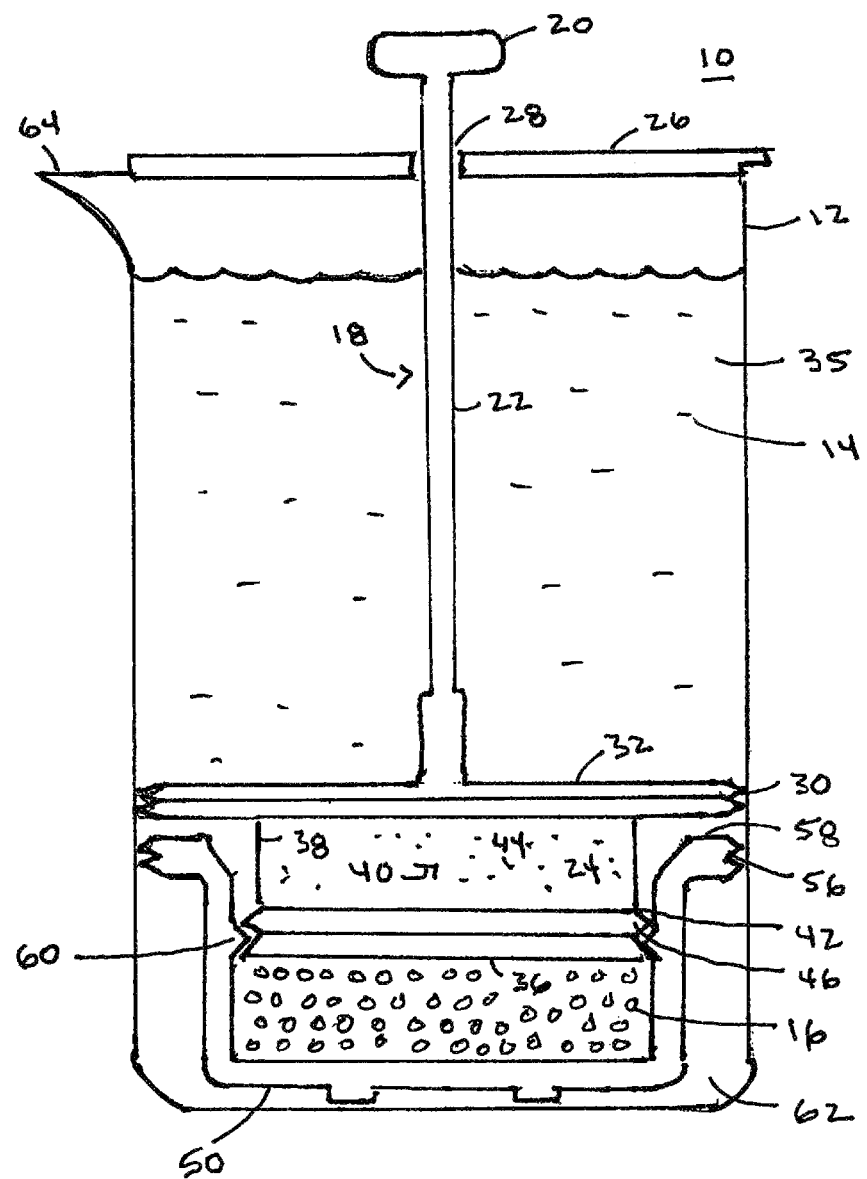
FIG. 2 depicts a vertical section of the example embodiment shown in FIG. 1 with plunging element pressed down through the container containing the mixture and couple with the container insert such that the infusing material is trapped between the plunging element and the insert.

FIG. 2 shows the extraction apparatus of FIG. 1 in a second position where the plunger element 18 has been moved along the vertical axis of the container 12 such that the filtration basket 24 is coupled with the container insert 48 with the infusible material 16 sandwiched between the second surface 36 of the filtration basket 24 and the bottom interior surface of the container insert 48.

As the plunger element 18 is moved in the infusing container 12 containing the mixture of extract 14 and infusible material 16, extract 14 will flow through one or more of the second surface 36, the side walls 38 and the first surface 32 of the filtration basket 24. Once the filtration basket 24 is moved down into the container insert 48, the extract has been substantially separated from the infusible material 16 and the infusible material 16 may be stored between the filtration basket 24 and the container insert 48 until desired for use without further contact with the infusible material.

The infusing container 12 may also optionally include a pouring spout 64, which may be used to pour the separated extract 14 from the infusing container 12 for consumption or other use. The infusing container 12 may further, optionally, include a handle (not shown) to facilitate lifting or moving the extraction apparatus 10 by a user.

One will note in looking at FIG. 2 that the plunger element 18 is coupled with the container insert 48 in that the coupling means 46 of the filtration basket 24 which, in this embodiment, comprises essentially a silicone band located on the lower side walls 38 of the filtration basket 24, has mated with the corresponding coupling means 60 of the container insert 48 which, in the embodiment shown, is a silicone band located on the upper portions of the inner side walls 52 of the container insert 48. While the corresponding coupling means is elastic enough to allow coupling, they prevent the plunging element 18 from de-coupling with the container insert 48 when the plunging element 18 and container insert 48 are pulled out of the infusing container 12.

Figure 3:
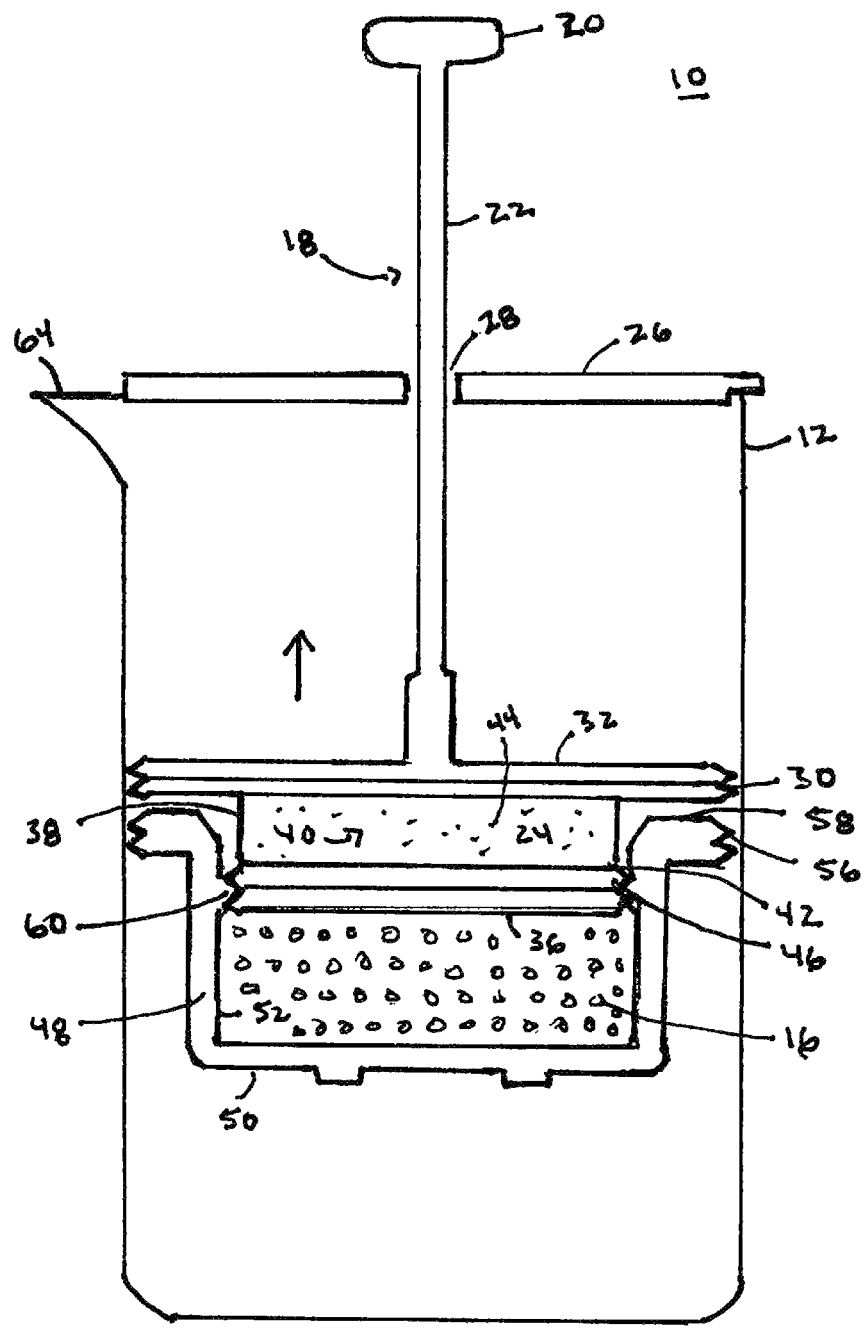
FIG. 3 depicts a vertical section of the example embodiment shown in FIGS. 1 and 2 with plunging element coupled with the insert and being pulled out of the infusing container with the infusing trapped between the plunging element and insert.

FIG. 3 shows the extraction apparatus of FIGS. 1 and 2 in a third position wherein the plunger element 18 coupled with the container insert 48 is being pulled out of the infusing container 12, substantially removing the infusible material 16 from the infusion container 12. In the example shown, the extraction of the plunger element 18, insert 48 and infusible material 16 is done after the extract has been removed from the container. However, in alternative embodiments, the extraction may be done while extract remains in the infusing container 12. In such embodiments, it would be required that some method of allowing the extract to flow into the space 62 between the insert 48 and the bottom of the container 12. This can be accomplished because the insert filtration openings 58 located in the rim 54 of the container insert 48 allow the extract to pass between the chamber containing only extract (which in this example is the second chamber 35) and the space 62 which is between the exterior surface of the container insert 48 and the bottom of the infusing container 12. During this process of pulling the coupled plunger element 18 and container 48 up together through the extract 14, the extract will flow from the second chamber 35 through the filtration basket 24 and through the insert filtration openings 58, effectively filtering the extract 14 again. In alternative embodiments, the container insert 48 does not have filtration openings 58 in which case it would be difficult to pull the coupled container insert 48 up and through the infusing container 12 with extract still contained therein. With such embodiments, the user would need to consume or otherwise empty the extract 14 into another container before pulling the coupled plunger element 18 and container insert 48 from the infusing container 12. However, as previously mentioned, such filtration openings 58 are helpful for alleviating a vacuum seal that may form between the insert and the container and thus prevent the insert from being easily removed.

FIG. 4 is a vertical section of an exemplary embodiment of a plunger element 18 configured similarly to a French press type coffee and/or tea making plunger adapted to fit within an infusing container similar to that shown in FIGS. 1-3, and to be moved within the infusing container (not shown) along a vertical axis thereof, by means such as the elongated handle means comprised, in this embodiment, of a rod 22 attached at one end to an optional knob 20 and at the other with a filtration basket 24. One will note that the filtration chamber 40 is defined by the first surface 32, second surface 36 and third surface 38 (or side walls) of the filtration basket 24. The chamber 40 may be accessible by access means 42 which in this example is located at the junction between the second surface 36 and third surface 38 by means of a screw off access (threads not shown). The coupling means 46 consist of a double edged gasket that fits over a protrusion 60 (shown in FIGS. 7-9) in the insert. The perforations 44 in the first 32, second, 36 and third 38 surfaces are designed to be large enough to allow extract to flow into and out of the chamber 40 while being small enough to substantially prevent the infusible material from flowing in or out. In alternative embodiments, the chamber is accessible to allow for additional filtration means (such as paper filters) to be utilized within the filter chamber 40. Access to the filter chamber is essential in this case to allow for placement and removal of such additional filtration means. However, is alternative embodiments where additional filtration means isn't needed or where the additional filtration means consists of a permanently placed material (such as a specialized sponge or mesh) such access may not be required.

FIG. 5 top side perspective view of the exemplary embodiment of the plunger element shown in FIG. 4. This view shows that the first filtration surface 32 is perforated as is the third surface 38. In some alternative embodiments, the third surface (i.e. the walls of the filtration basket 24) are solid or otherwise do not allow the extract to flow through. In alternative embodiments, the sizes of the filtration openings 44 may be different for the first 32, second 36 and third 38 filtration surfaces in order to adjust the amount of infusible material that is left behind in the extract. In some embodiments the filtration openings 44 located at the first filtration surface 32 may be larger in order to allow more extract to flow out the top as the plunger element is pressed downward. In some embodiments, the first filtration surface 32 is eliminated—in other words creating an open chamber 40 at the top and the rod 22 is instead connected with the bottom surface 36.

FIG. 6 is a bottom side perspective view of an exemplary embodiment of the plunger element shown in FIGS. 4 and 5. In this view, the bottom filtration surface 36 of the filtration basket 24 is visible. One will note that the coupling means 46 is located peripheral to the joint between the second surface 36 and the third surface 38 (i.e. the walls of the filtration basket 24). In alternative embodiments, additional or alternative coupling means may be located at mid-point locations around the thirds surface 38 and will correspond to coupling means 60 located at the interior surface of the insert 48.

Figure 7:
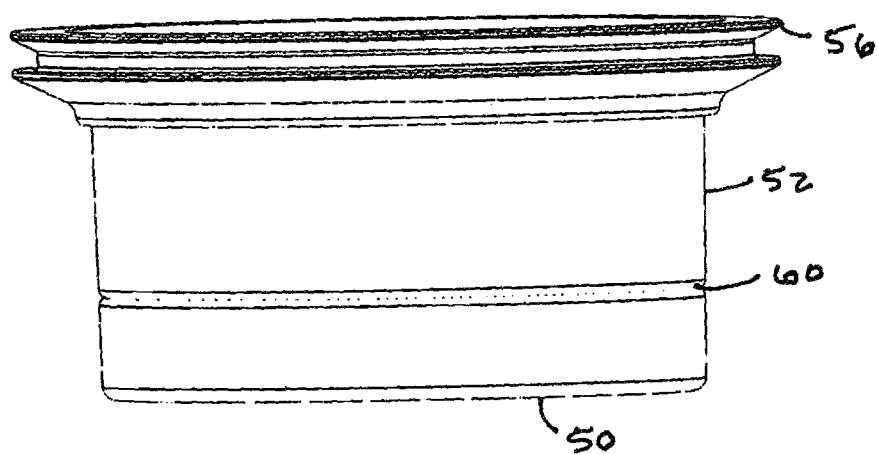
FIG. 7 is a side perspective view of an example embodiment of a container insert consistent with the principles of the present invention.

FIG. 7 is a side perspective view of an example embodiment of a container insert consistent with the principles of the present invention. In this view, the peripheral seal 56 is located at the top of the insert near the rim and consists of a double lipped gasket preferably made of silicone or similar strong and elastic material. One will note that the bottom of the insert 50 may be made of or covered by a gasket of relatively elastic or soft material that would guard against damage to the container when the plunger element 18 is pressed firmly into the insert. As seen in FIGS. 1-3 as well as FIG. 9, the bottom of the insert 48 is not (preferably) flat. This is to help prevent the insert from becoming stuck (by way of vacuum or liquid adhesion) on the bottom of the container inhibiting the insert from being pulled up when coupled with the plunger element. One will note that the corresponding coupling means 60 located on the insert is visible as a banded portion of the insert side wall that is recessed inward (bent inward toward the center of the insert) providing a banded protrusion on the interior surface of the insert. It is not required that the exterior of the insert be recessed in this way as long as the corresponding coupling means (in this case the banded protrusion) is located on the interior surface.

Figure 8:
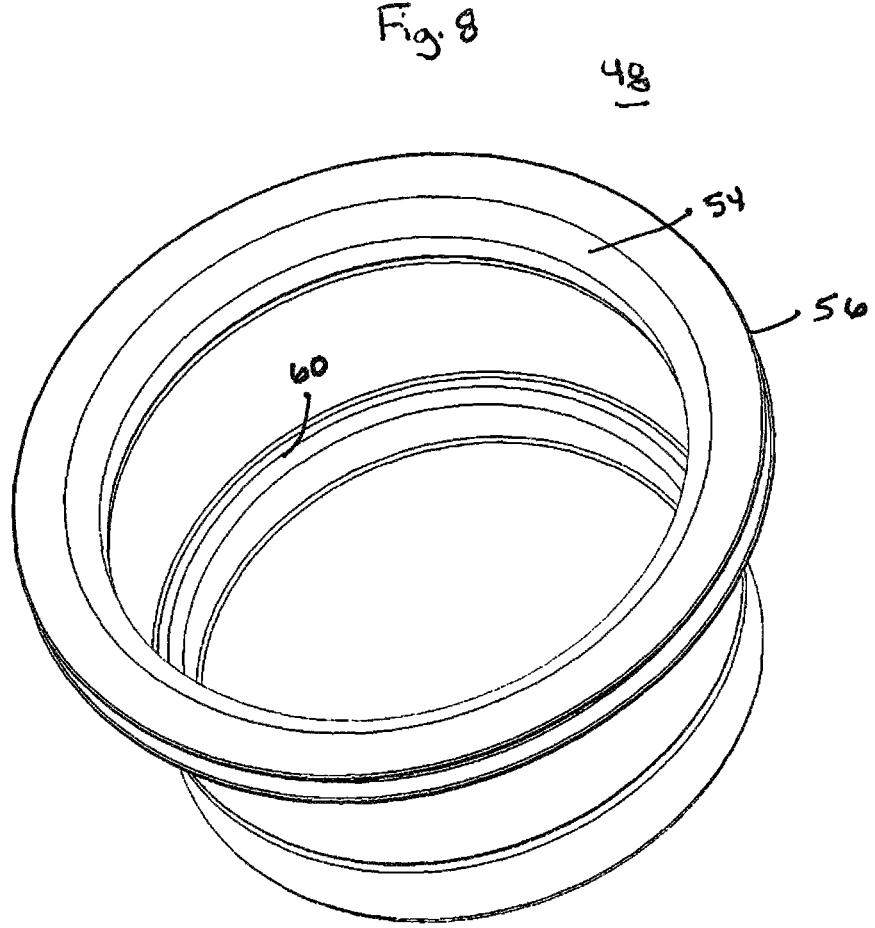
FIG. 8 is a top side perspective view of the exemplary embodiment of the container insert shown in FIG. 7.

FIG. 8 is a top side perspective view of the exemplary embodiment of the container insert shown in FIG. 7. In this view the beveled rim 54 as well as the interior coupling means 60 are visible. One will note that this view does not include the filtration openings 58 (not shown) at the rim of the insert. If such openings were present, they would be located at the rim 54 or at the peripheral seal adjacent the rim 54. The purpose of such openings 58 which are optional is clearly described above.

Figure 9:
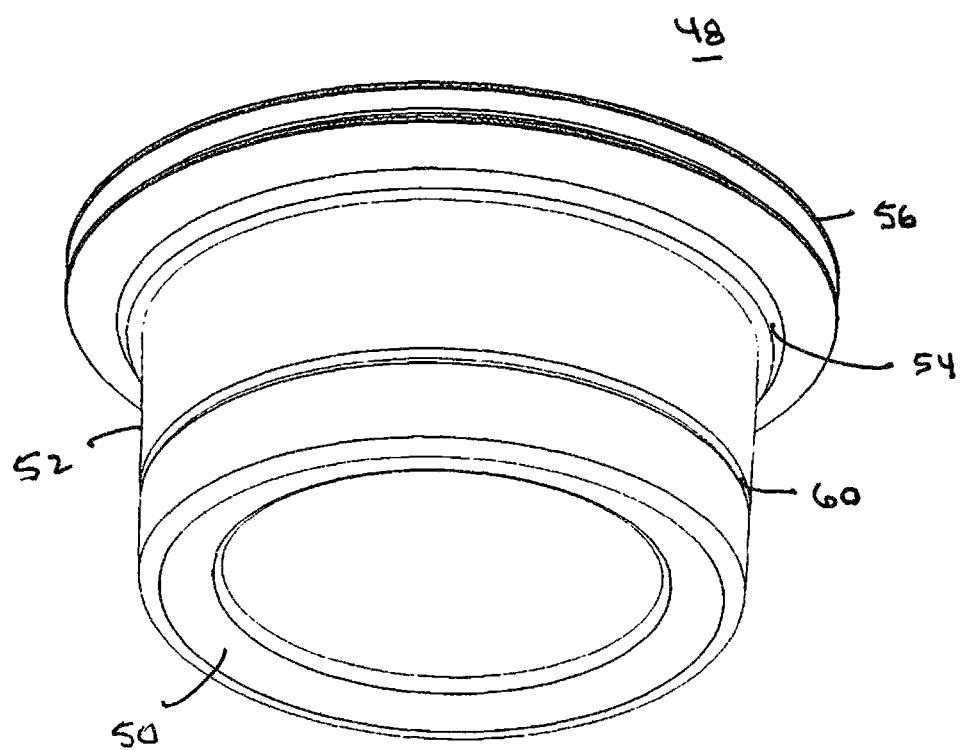
FIG. 9 is a bottom side perspective view of the exemplary embodiment of the container insert shown in FIG. 8.

FIG. 9 is a bottom side perspective view of the exemplary embodiment of the container insert shown in FIG. 8. One will note the beveled bottom surface 50 of the insert which may preferably be made of elastic or soft materials to guard against the force caused by pressure on the insert from the plunger element being pushed into the insert during the use from damaging the container (which may be made of glass, ceramic or other breakable material) and to prevent a vacuum seal from inhibiting the removal of the insert from the bottom of the container. Again, as described above, it is not necessary that the banded coupling means 60 be visible as a recessed band from the exterior surface of the insert but such configuration may be preferable for manufacturing purposes. The peripheral seal 56 and the beveled rim 54 are also visible as noted.

Figure 10:
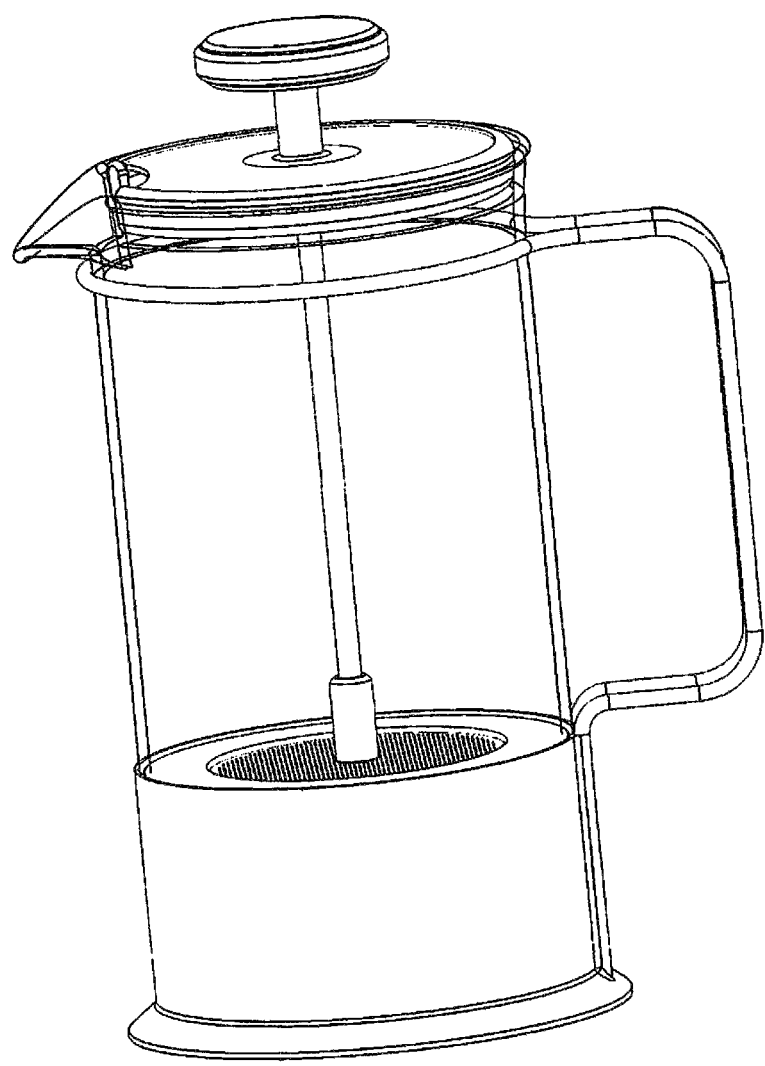
FIG. 10 is a perspective view of an example embodiment of an apparatus consistent with the principles of the present invention.

FIG. 10 is a perspective view of an example embodiment of an apparatus consistent with the principles of the present invention. This embodiment of the apparatus is housed within a clear container with a separate solid base with extending handle that surrounds and holds the container. In other words, the clear container sits down into a base and may be removed therefrom for cleaning and other purposes. The top of the base is substantially flush with the sealing means of the plunger element when the plunger element is fully pressed into the insert located at the bottom of the container (but hidden from view by the solid base) in this view.

The method for using the embodiments described in FIGS. 1-10 include the steps of placing the container insert 48 at the bottom of a container, placing infusible material 16 (such as coffee grounds or tea leaves) in the container insert 48, pouring hot water or other liquid into the container 48, inserting and centering the plunger element 18 in the container and optionally placing the lid 26 on the container 12. Once the infusible material has had enough time to steep in the liquid, the next step is for the user to push down on the knob 20 of the plunger element 18 to move the filtration basket 24 down into the insert 48 such that the infusible material is separated from the extract 14 and the corresponding coupling means 46 and 60 have mated with infusible material trapped between the bottom of the filtration basket and the interior surface of the insert 48. The extract may then be poured out of the container. In some embodiments (described above) having means (such as filtration openings 58) for allowing the extract to flow to the space 62 defined between the exterior surface of the insert 48 and the container bottom, the extract may remain in the container 12 while the plunger element 18, insert 48 and spent infusible material are removed. To remove the plunger element 18, insert 48 and infusible material, the user pulls up on the plunger element handle 20 to extract them from the container. Once removed, the plunger element 18 may be uncoupled from the insert 48 and the spent infusible material (coffee grounds or tea leaves, for example) removed. In embodiments where there filtration chamber 40 is accessible, the filtration chamber may be accessed to remove any paper (or other) filter placed therein and for cleaning.

The present invention has now been described with reference to several embodiments thereof. The entire disclosure of any patent or patent application identified herein is hereby incorporated by reference. The foregoing detailed description and examples have been provided for clarity of understanding only. No unnecessary limitations are to be understood therefrom. It will be apparent to those skilled in the art that many changes can be made in the embodiments described without departing from the scope of the invention. Further, the steps used to describe the method for making the various example embodiments may be performed in different order and the number of steps may differ depending on the complexity (i.e. number of elements) associated with each example apparatus. Thus, the scope of the present invention should not be limited to the assemblies described herein, but only by the assemblies and methods described by the language of the claims and their equivalents.

The invention claimed is:

1. An apparatus for separating an infused extract from a mixture of an infusible material and the extract while also allowing easy removal of the infusible material, the apparatus comprising:
   a container configured to prepare beverages and hold the mixture of infused extract and infusible material and having an opening, a bottom, a vertical axis and centerline that extends between said container opening and bottom, and one or more inner walls oriented substantially parallel to said a vertical axis and centerline;
   an insert adapted to be inserted into said container through said opening and removably seated at the bottom thereof;
   an elongated plunger element;
   a filtering means attached to said elongated plunger element and which is adapted for separating the infusible material from the infused extract as the elongated plunging element is moved down along the vertical axis of said container; and
   a coupling means attached to said filtering means and adapted for coupling said elongated plunger element with said insert for the purpose of removing said insert from said container;
   wherein the insert and filtering means are further adapted to hold the infusible material between the filtering means and the insert when the elongated plunger element is coupled with the insert and removed from the container; and
   wherein the filtering means of the plunger element includes a filtering basket having first and second surfaces substantially transverse to the vertical axis of the container, which first and second surfaces comprise perforation holes to allow the extract to flow through, and a third surface substantially parallel with the vertical axis of the container and connecting the first and second substantially transverse surfaces.

2. The apparatus of claim 1, further comprising:
   a removable filter means,
   wherein the filtering basket is adapted to accommodate said removable filter means for filtering extract flowing between the first and second perforated surfaces when the plunging element is pushed down through said container and into the insert.

3. The apparatus of claim 2 wherein the filtering basket defines a filtration chamber with a chamber interior and wherein said filtration chamber is adapted to allow access to said chamber interior in order to place and remove said removable filter means from said within the filtration chamber.

4. The apparatus of claim 1 wherein said coupling means for coupling the plunger element to the insert includes a ringed silicone seal located on the plunger element which fits snugly against the interior surface of the insert as the plunger is moved down into the insert.

5. The apparatus of claim 2 wherein said coupling means for coupling the plunger element to the insert includes a ringed silicone seal located on the plunger element which fits snugly against the interior surface of the insert as the plunger is moved down into the insert.

6. The apparatus of claim 1 wherein the insert has an inward sloping rim with a peripheral seal for sealing said inward sloping rim to the inner walls of the container such that when the plunger is inserted within the container and pushed down along the vertical axis therein to filter the infusible material from the infused extract, the infusible material is pushed down into the insert and not between the insert and the interior walls of the container.

7. The apparatus of claim 2 wherein the insert has an inward sloping rim with a peripheral seal for sealing said inward sloping rim to the inner walls of the container such that when the plunger is inserted within the container and pushed down along the vertical axis therein to filter the infusible material from the infused extract, the infusible material is pushed down into the insert and not between the insert and the interior walls of the container.

8. The apparatus of claim 1 wherein the insert has a means for seating the insert on the bottom of the container to prevent damage to the container and for seating the insert on the bottom of the container so as to allow the insert to be easily removed from the container.

9. The apparatus of claim 1 wherein the insert is adapted for receiving the filtering means of the plunger element so that said infusible material may be separated from said infused extract, when said filtering means is moved down through said container and retained within said insert, so as to allow for the easy removal of the infusible material from the container.

* * * * *